(12) United States Patent
Dubuc (10) Patent No.: US 6,981,784 B2
(45) Date of Patent: Jan. 3, 2006

(54) SIDE PROJECTING LED SIGNAL

(75) Inventor: Eden Dubuc, Lachine (CA)

(73) Assignee: GELcore, LLC, Valley View, OH (US)

( * ) Notice: Subject to any disclaimer, the term of this patent is extended or adjusted under 35 U.S.C. 154(b) by 0 days.

(21) Appl. No.: 10/431,907

(22) Filed: May 8, 2003

(65) Prior Publication Data

US 2004/0004836 A1 Jan. 8, 2004

Related U.S. Application Data (60) Provisional application No. 60/384,225, filed on May 30, 2002.

(51) Int. Cl.
*F21V 5/00* (2006.01)

(52) U.S. Cl. ............... 362/331; 362/240; 362/249
(58) Field of Classification Search ......... 362/327–340, 362/240, 244, 249
See application file for complete search history.

(56) References Cited

U.S. PATENT DOCUMENTS 4,583,151 A * 4/1986 Nagel ..................... 362/29
6,402,347 B1 * 6/2002 Maas et al. .............. 362/294
2003/0137838 A1 * 7/2003 Rizkin et al. ............ 362/240

* cited by examiner

*Primary Examiner*—John Anthony Ward
(74) *Attorney, Agent, or Firm*—Fay, Sharpe, Fagan, Minnich & McKee, LLP

(57) ABSTRACT

A total internal reflection element having a plurality of total internal reflection faces and a plurality of exit faces which redirect light from a light source into a side direction. The total internal reflection element is manufactured by injection molding.

The curved entry faces have the optical effect of concentrating incident light onto a center of the corresponding total internal reflection face. This allows light impinging on the total internal reflection face from a wider range of angles to be redirected for side projection through the desired exit face.

The total internal reflection element is used in a signal. The signal has a housing and can be placed at a variety of heights.

34 Claims, 15 Drawing Sheets

SIDE PROJECTING LED SIGNAL

This application claims the benefit of U.S. Provisional Application 60/384,225 filed May 30, 2002 entitled Side Projecting LED Signal.

BACKGROUND OF THE INVENTION

The present invention relates to LED signals. More specifically, the invention relates to an LED signal wherein the signal has a side display aspect generated via light ray redirection utilizing total internal reflection.

DESCRIPTION OF RELATED ART

Previous side projecting signals, for example directional warning signals, airport taxiway lights, wall lights and/or signage illuminators utilized incandescent or florescent light sources and reflective/mirrored surfaces to direct the signal's light output. Because LED light output is generally in a conical beam, LED warning beacons have been designed utilizing a matrix of LEDs pointing in desired directions and/or a matrix of LEDs redirected by a reflective/mirrored surface.

A design specific matrix of LEDs configured for a desired display aspect raises manufacturing costs as the desired display aspect changes between different signal models and a design specific printed circuit board (PCB) or other mounting surface must be created. A more efficient solution is to use a common LED matrix, circuitry and housing, creating different display aspects via changes only to the optical components. Also, for example, creating a 180° display aspect without using light redirection, requires multiple PCBs, each oriented in a segment of the desired display aspect. Reflectors or mirrored surfaces add to manufacturing costs compared to a purely injection molded component solution.

Total internal reflection is a phenomena where electromagnetic radiation (light) in a given medium (for example an acrylic or polycarbonite material) incident on the boundary with a less dense medium (for example air), at an angle equal to or larger than the critical angle, is completely reflected from the boundary. Commonly used in fiber optics technology and in binocular prisms, properly designed optical components using total internal reflection (TIR) do not require expensive mirror/reflective coated surfaces to re-direct light. Total internal reflection is described in detail in "Modern Optical Engineering" Library of Congress catalog number 66-18214, hereby incorporated by reference.

To achieve a materials savings in a TIR element, rather than a single large reflective face, a series of smaller consecutive TIR faces may be utilized. As the interface between the consecutive TIR faces creates an undesired light refraction, it is desirable that the interface between faces be as small, i.e. sharp, as possible. Previously this required the TIR surfaces to be precision machined rather than or in addition to being injection molded. Precision machining causes a dramatic manufacturing cost increase as compared to injection molding alone. Therefore it is an object of the present invention to provide a side projecting LED signal without a reflective coated surface and a reduced or eliminated requirement for precision machining of the optical elements.

SUMMARY OF THE INVENTION

A side projecting LED signal utilizing a total internal reflection element designed for manufacture by injection molding. A plurality of curved entry faces is aligned with a corresponding plurality of TIR and exit faces which redirect light emitted from the base of the signal into a side direction. The curved entry face(s) having the optical effect of concentrating incident light onto a center of the corresponding TIR face. Thereby allowing light impinging on the TIR face from a wider range of angles to be redirected for side projection through the desired exit face. The inventive signal loses only about half of the light that is lost by prior art stepped side projecting signals. The reduction in light lost as compared to prior art signals is due to the radius between faces.

The curved entry face is angled in the direction of the next stepped level which lowers light loss creating zones by decreasing the optical area dedicated to the radiuses between stepped levels of the entry faces. The signal may be configured for retrofitting into existing incandescent signal housings, for example airport taxiway omni-directional warning signals.

DETAILED DESCRIPTION OF THE DRAWINGS

Figure 1:
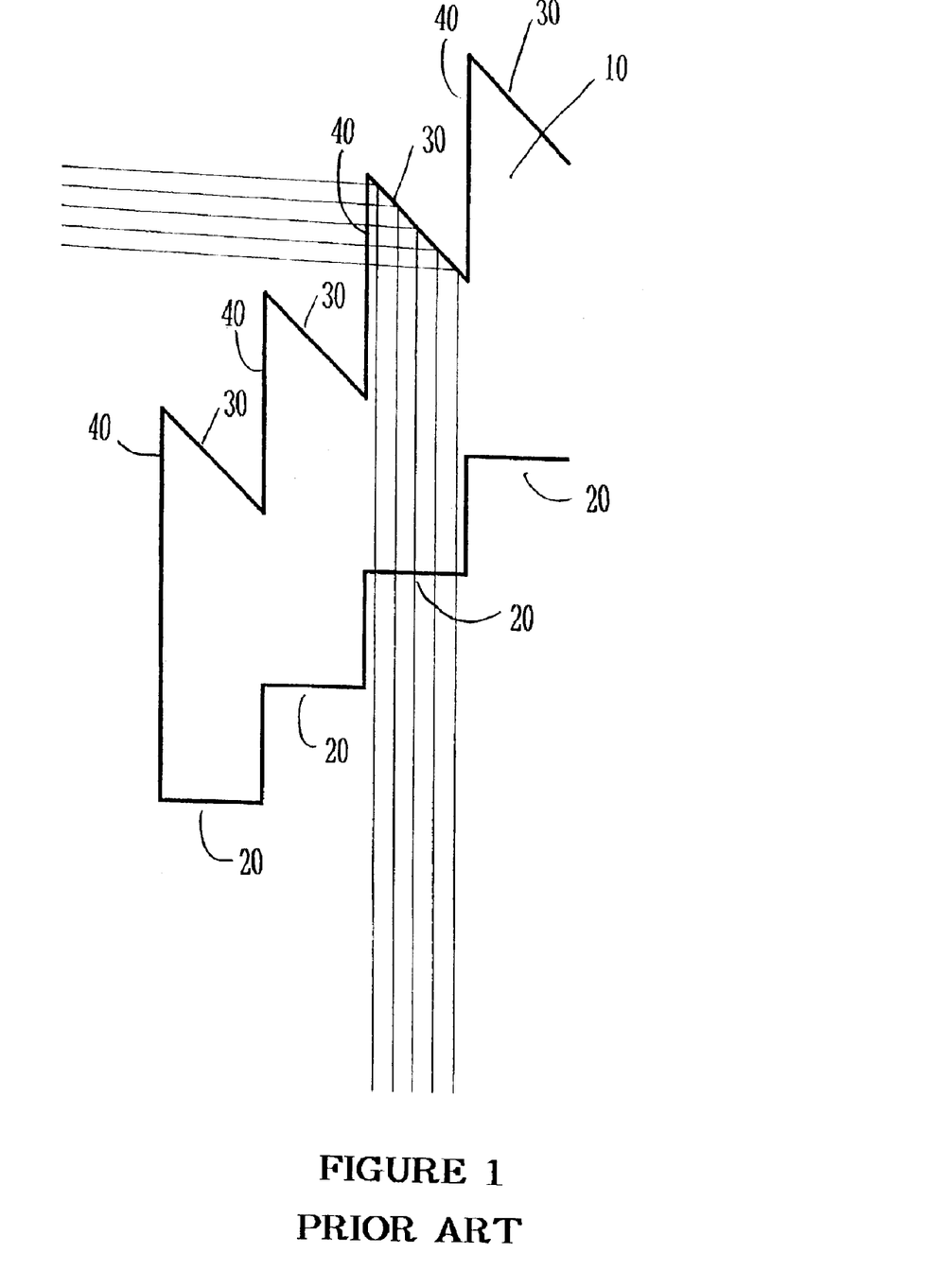
FIG. 1 is a partial side view ray diagram of a TIR element showing a stepped configuration of the entry face embodiment.
Figure 5:
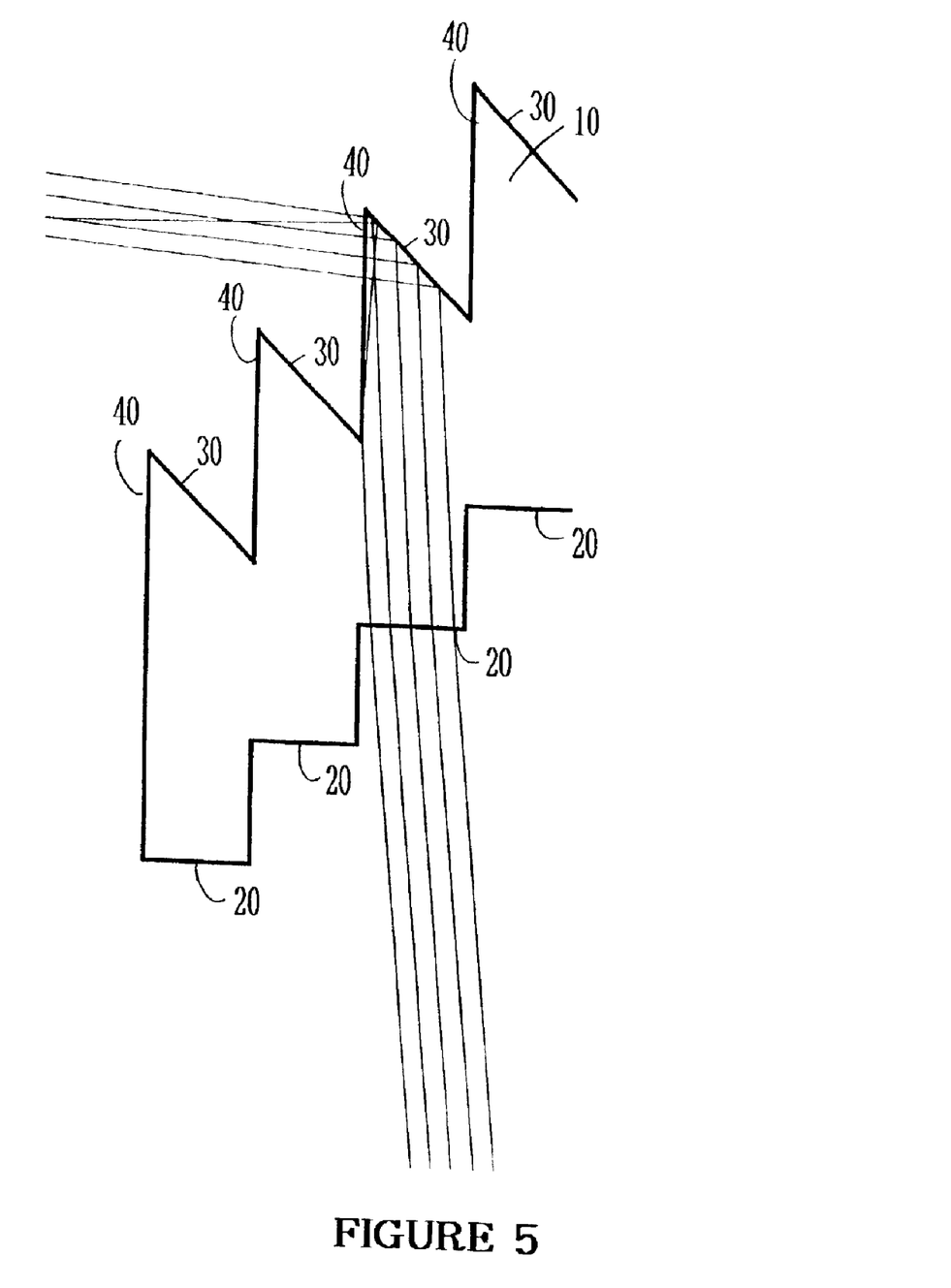
FIG. 5 is a ray diagram of a stepped entry face TIR element embodiment showing the effect of incident light rays that are not aligned, on one side, with the lens axis.
Figure 6:
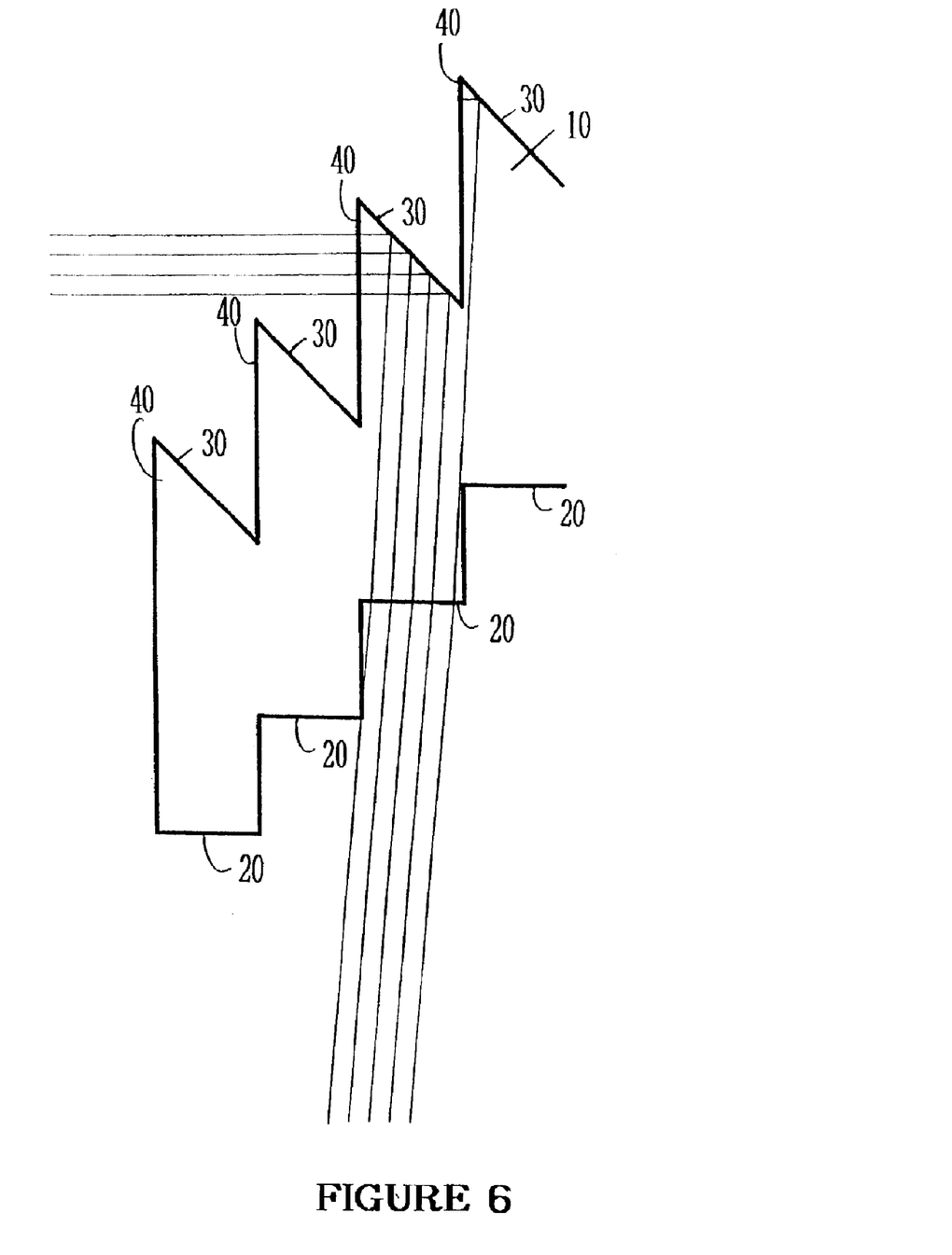
FIG. 6 is a ray diagram of a stepped entry face TIR element embodiment showing the effect of incident light rays that are not aligned, on the other side, with the lens axis.

As shown in FIG. 1, a TIR element 10 may be constructed with a stepped configuration to minimize the space and materials required for the element. Light incident upon the entry face 20 is preferably parallel aligned with the lens axis so that all the light incident upon the entry face 20 impacts the corresponding TIR face 30. In FIGS. 5 and 6, a loss-creating reflection may occur or the intended TIR face 30 may be missed entirely by a portion of the incident rays.

Figure 3:
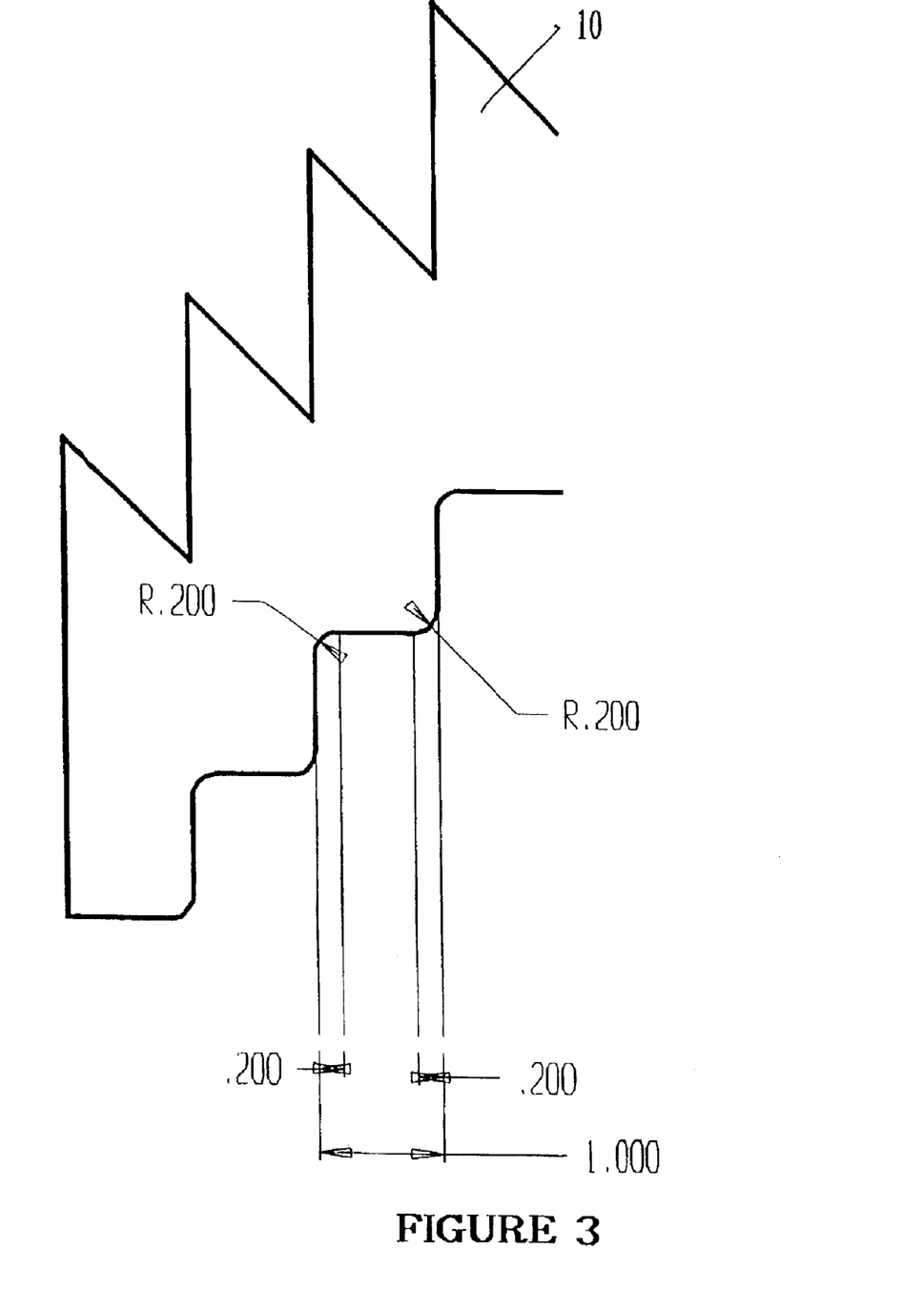
FIG. 3 is a partial side view schematic of a TIR element showing the radius diameters and resulting radius area in proportion to total entry face area of a stepped entry face embodiment.

To permit injection molding of the TIR element 10 without requiring a second machining step at least for the inner entry faces, radiuses are required at transition points between the steps as shown on FIG. 3. However, these radiuses begin to assume an unacceptable proportion of the total entry face area as the density of the TIR faces is increased to minimize the materials content of the TIR element 10. As shown in FIG. 3, the radiuses may consume, for example, 40% of the lens area. The 40% lens area dedicated to radiuses causing undesired refraction and thereby losses within the element. This effect is worsened when the incident light rays are not directed solely to the intended TIR face 30.

Figure 2:
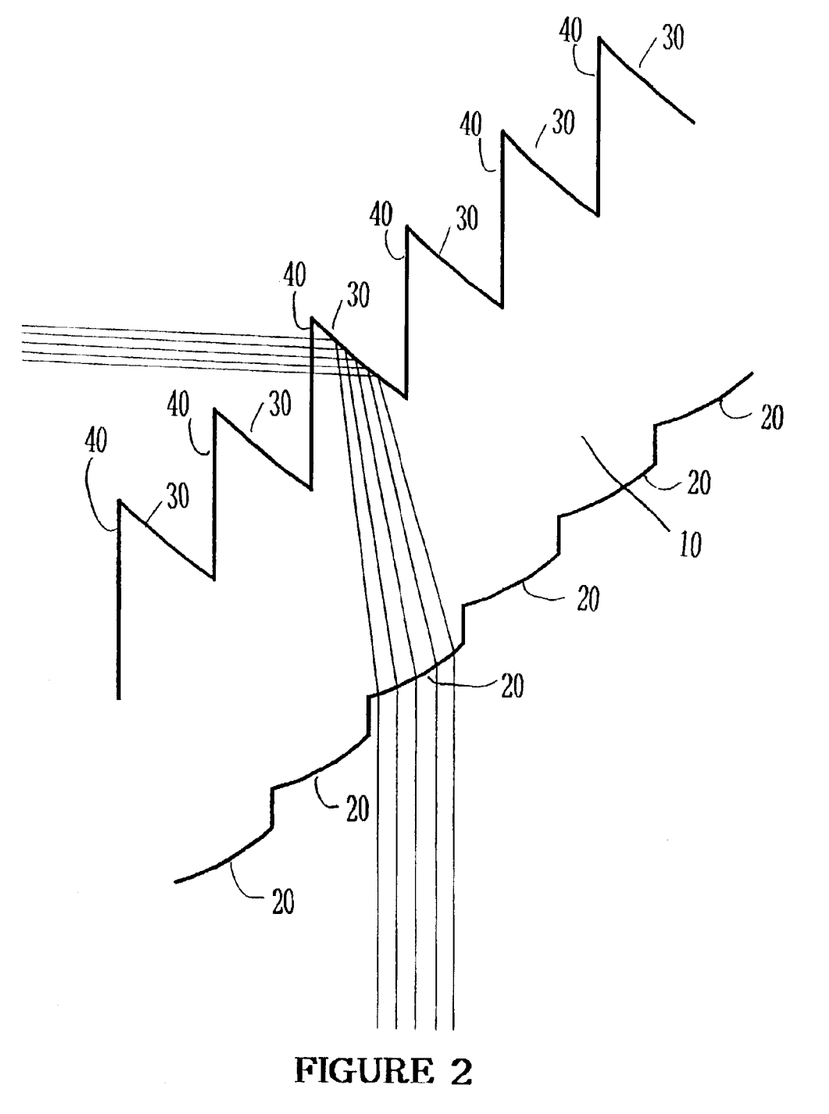
FIG. 2 is a partial side view ray diagram of a TIR element showing a curved entry face embodiment.
Figure 4:
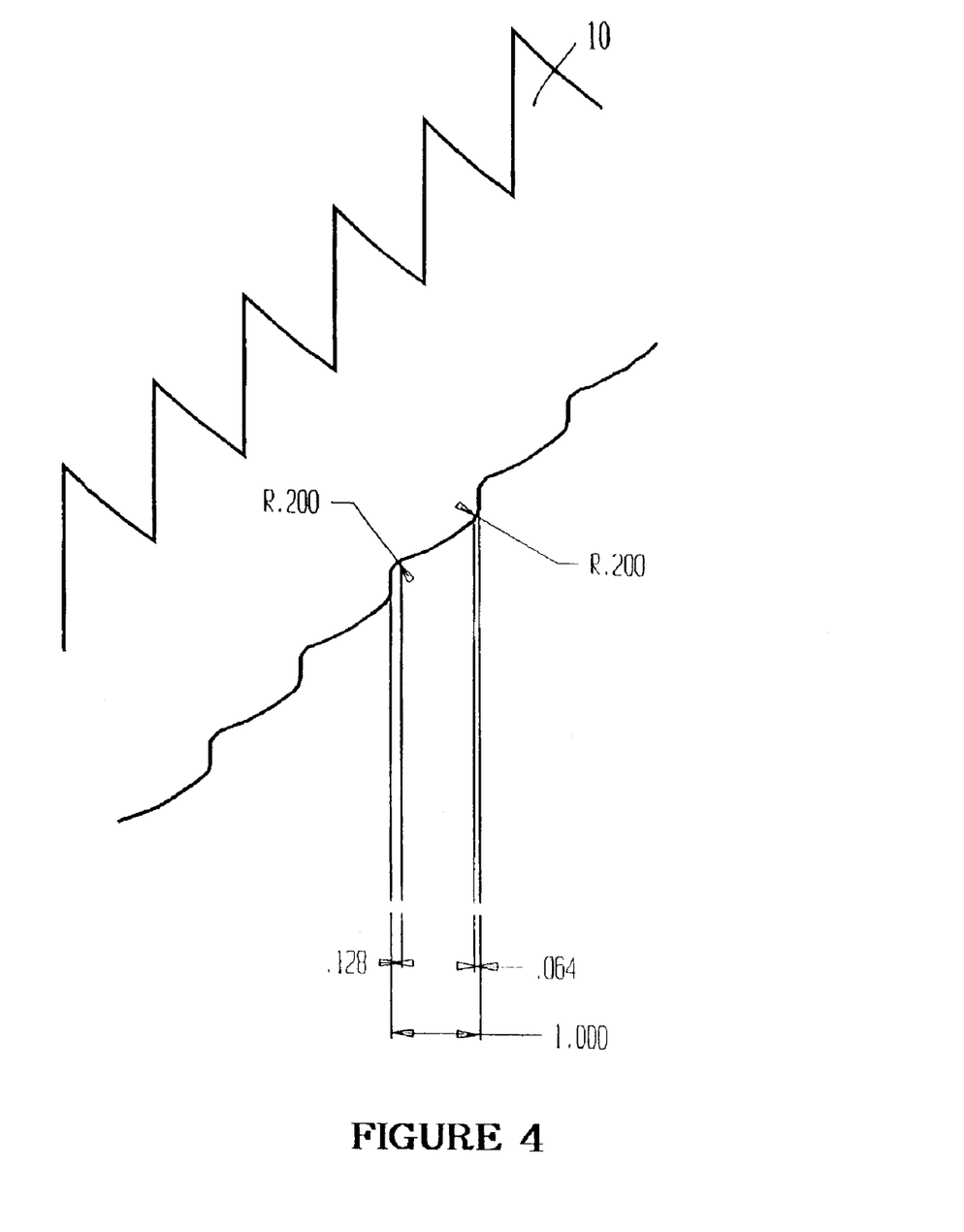
FIG. 4 is a partial side view schematic of a TIR element showing the radius diameters and resulting radius area in proportion to total entry face area of a curved entry face embodiment.
Figure 7:
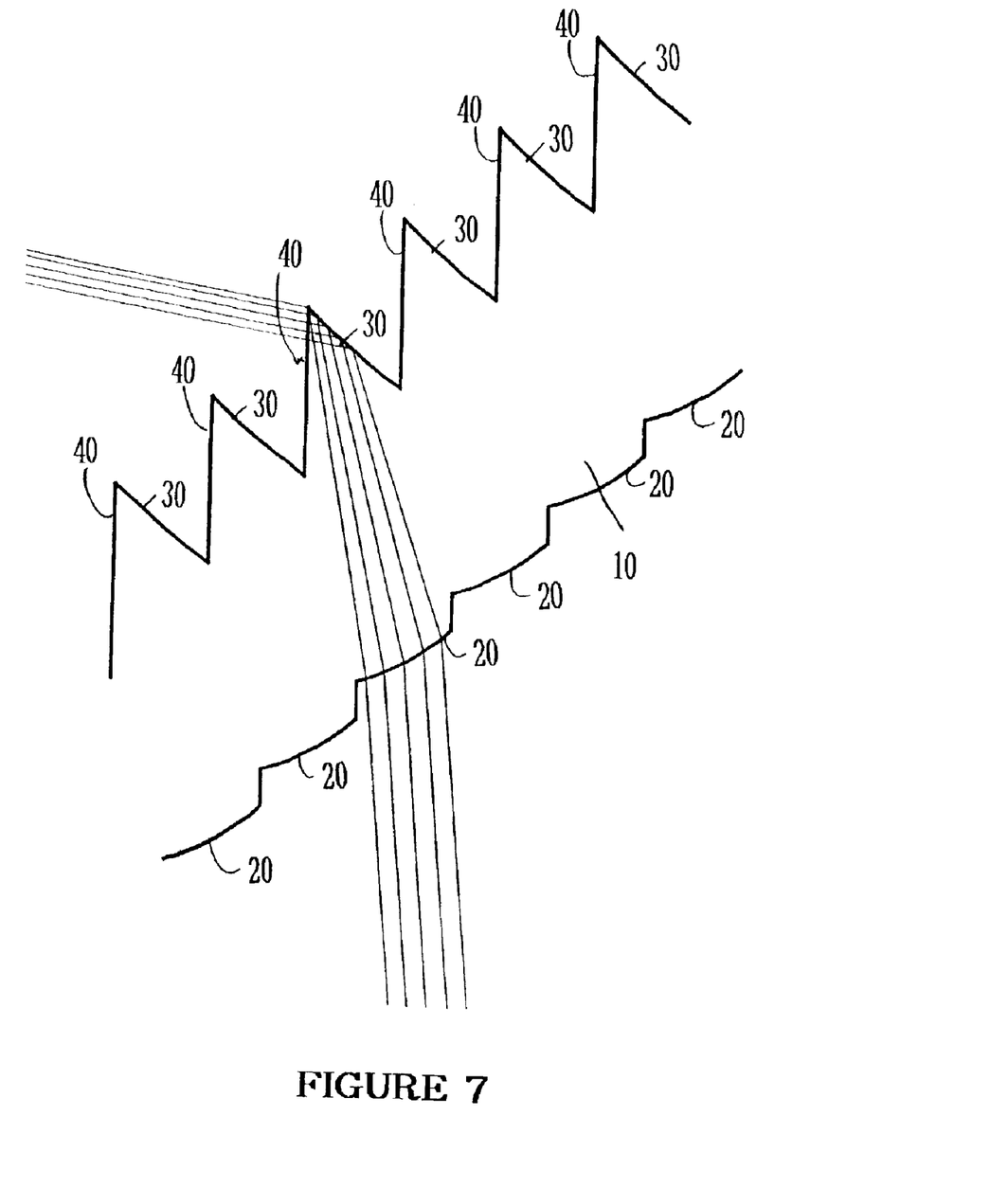
FIG. 7 is a ray diagram of a curved entry face TIR element embodiment showing the effect of incident light rays that are not aligned, on one side, with the lens axis.
Figure 8:
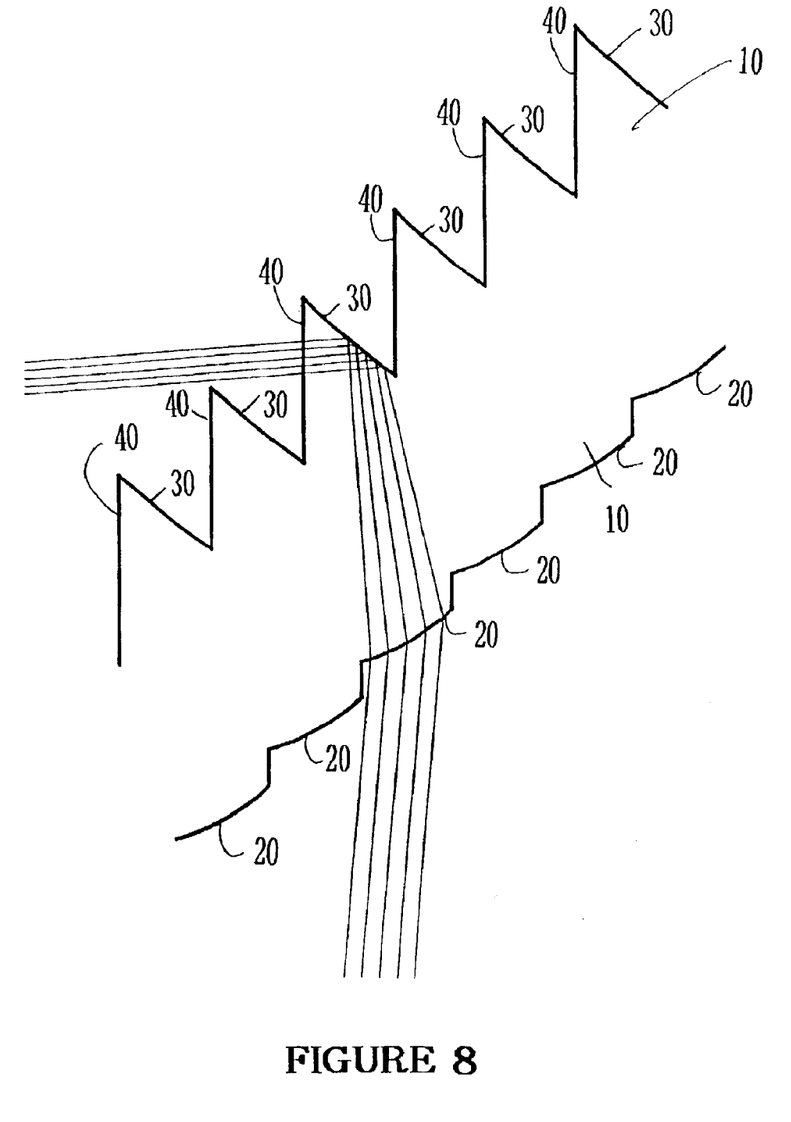
FIG. 8 is a ray diagram of a curved entry face TIR element embodiment showing the effect of incident light rays that are not aligned, on the other side, with the lens axis.

By configuring the incident face 20 with a sloped curve, as shown in FIG. 2, a slight concentration of the incident light rays is used to focus the incident rays upon a center target area of the TIR face. As shown in FIGS. 7 and 8, this results in a wider range of incident ray angles being directable onto the target TIR face. Further, as shown in FIG. 4, because the curved entry face is at a sloped angle to the next entry face, the resulting radius areas between the different incident surfaces are smaller in size even through the same radius is used. Because losses due to the radiuses are proportionally smaller, the TIR element 10 may be made even thinner via increased step density resulting in a minimized materials requirement and manufacturing cost for the TIR element 10.

Figure 9:
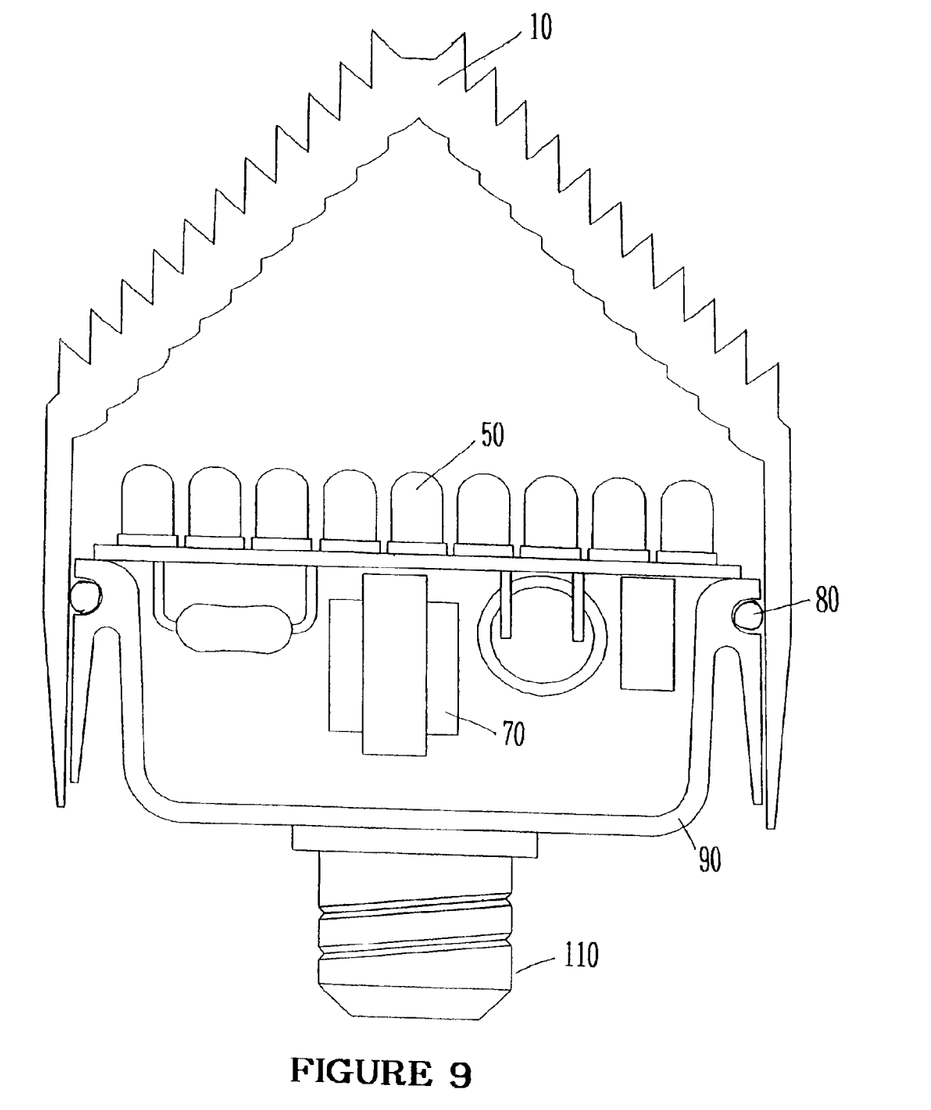
FIG. 9 is a cut-away side view of an omni-directional embodiment of the invention.
Figure 13:
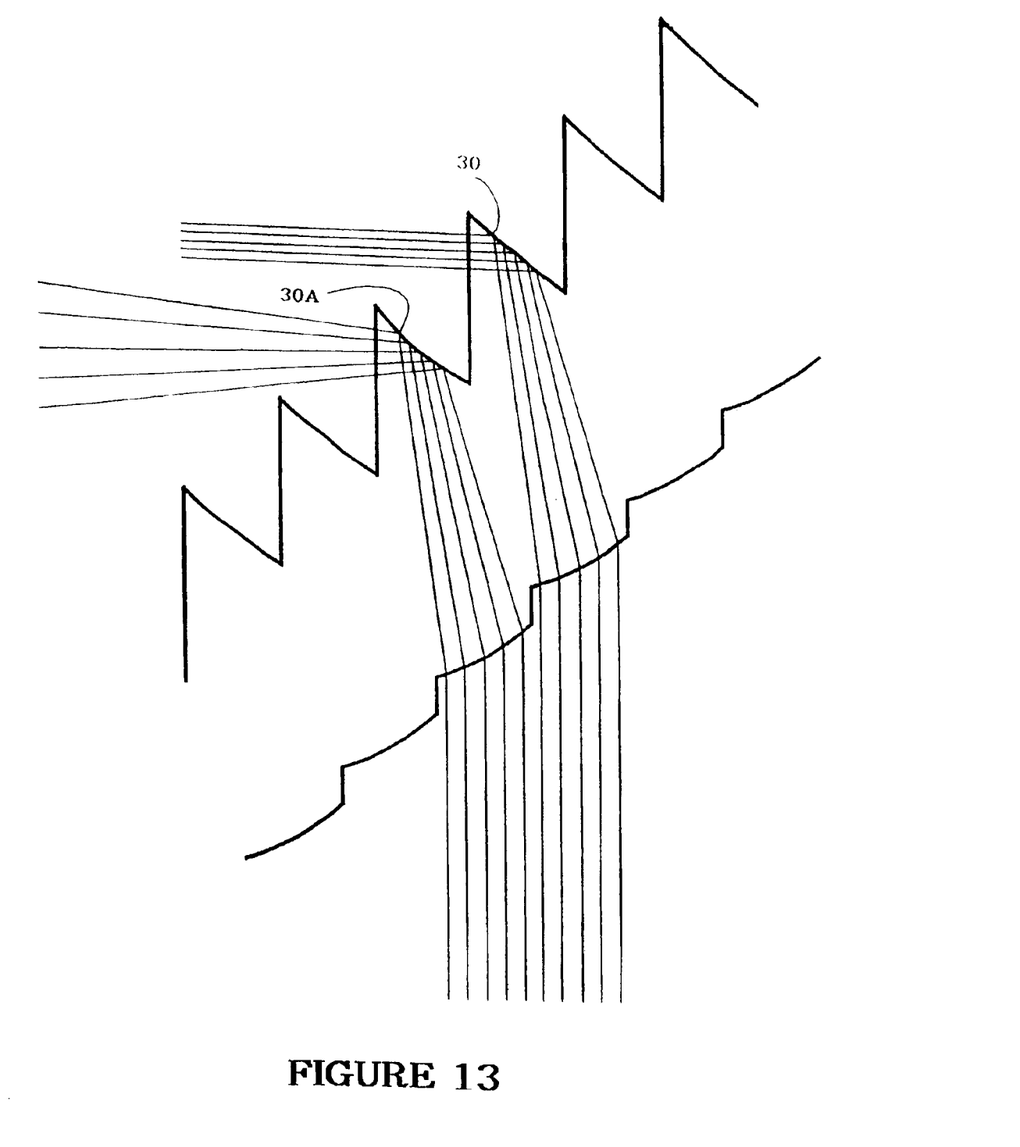
FIG. 13 is a partial side view ray diagram of a TIR element showing the effect of an alternative curved TIR face.

To create an omni-directional embodiment, the stepped TIR surface may be revolved into a cone. As shown in FIG. 9, the resulting signal would have a 360-degree display aspect. The spreading of the side emitted light may be controlled by the radius of the curved incident face 20, a curve on the TIR face and/or a curve of the exit face. As shown in FIG. 13, a curved TIR face 30a may be used for spreading, alone or in combination with a flat TIR face 30.

Figure 14:
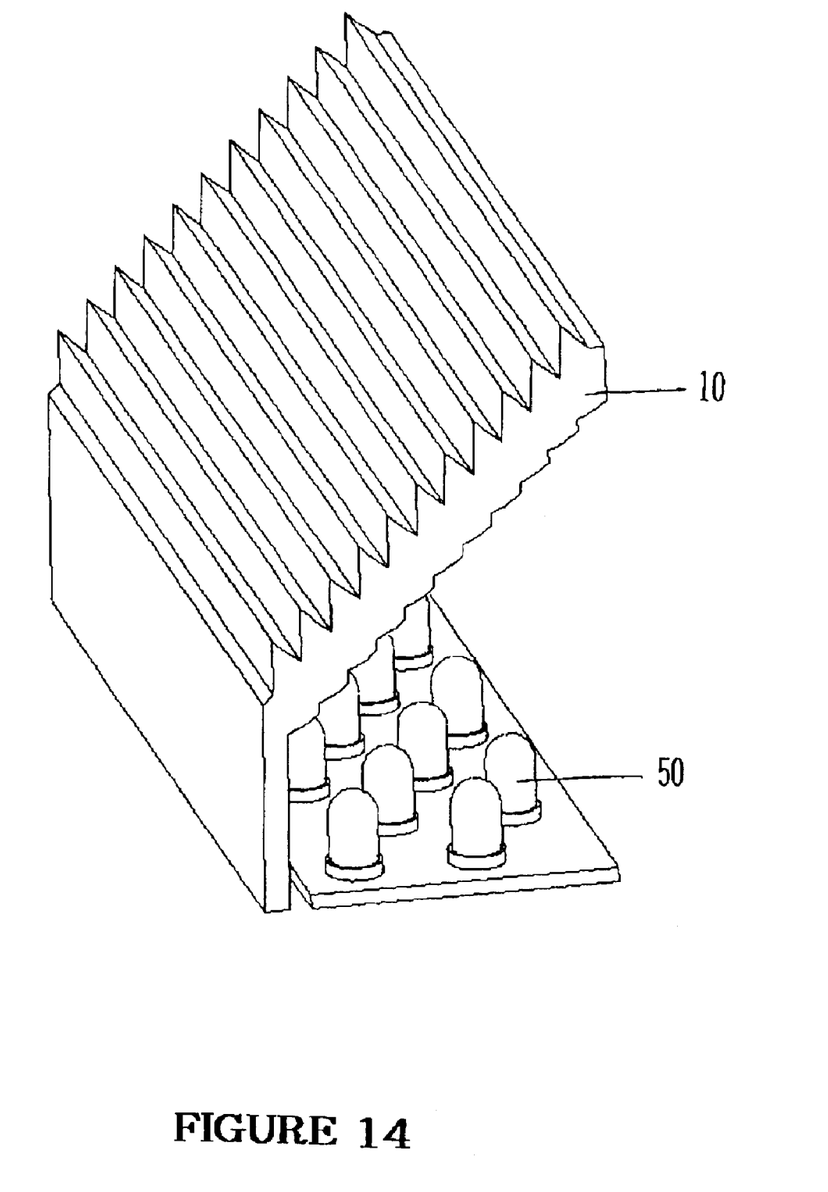
FIG. 14 is a cut-away side view of a unidirectional embodiment of the invention.

In FIG. 14, a uni-directional embodiment the stepped TIR surface 10 is shown. Preferably, the stepped TIR surface is substantially planar in the uni-directional embodiment. The uni-directional TIR element could be used in a wall mounted application, for example in a sign. The uni-directional TIR element can be used with or without a cover or housing. For indoor applications, a housing or cover is not needed to protect the TIR element 10 or LEDs 50 from dust, water and the elements. Thus, a cover or housing is optional.

The TIR element can combine two or more TIR surfaces 10 depending on the application. A TIR element could have two planar TIR surfaces to result in a bi-directional TIR element. In another embodiment, the TIR element could be partially conical and partially planar.

Figure 11A:
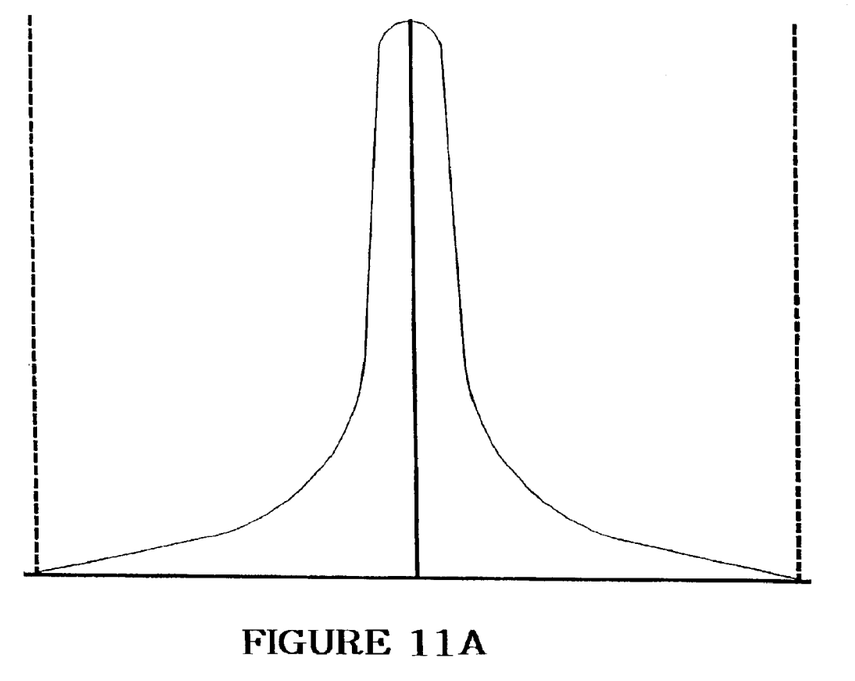
FIG. 11A is a directional light intensity diagram for the invention, with the optical element removed.
Figure 11B:
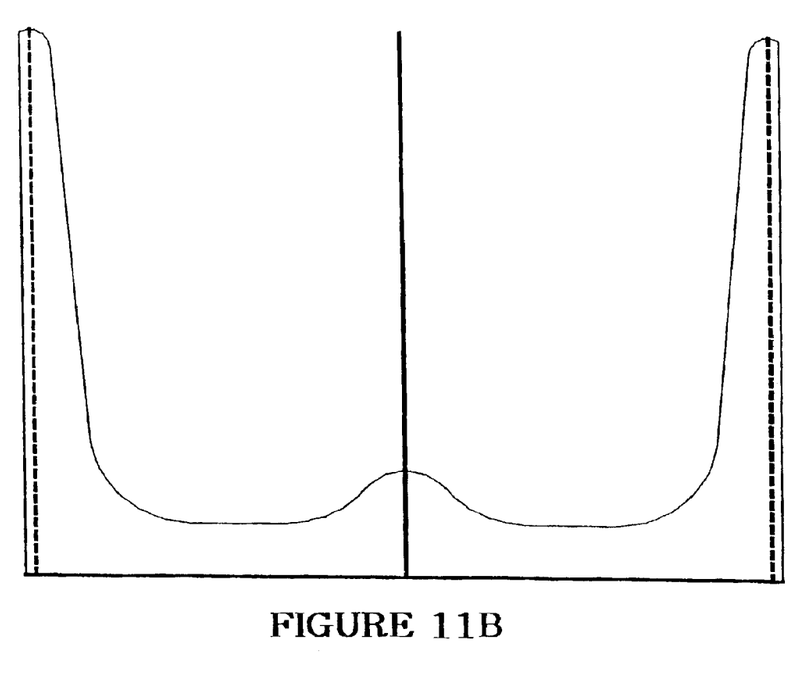
FIG. 11B is a directional light intensity diagram for the invention, with the optical element in place.

FIG. 11A shows a directional light emission intensity pattern for the invention without the TIR element 10 in place. The light is strongly concentrated on the vertical axis (the middle solid line) with very little, if any light extending in the horizontal axis direction (either edge dashed line). By using the TIR element 10, as shown in FIG. 11B, a directional light emission intensity pattern that is almost entirely horizontal is created (the horizontal light intensity paths are at either side edge's dashed line). The minimal vertical and baseline readings between the two horizontal axis directions is due to refraction at the entry face radiuses. The smaller the radiuses the lower, the light losses will be. A trade off is made between the materials content of the TIR element 10 and the acceptable light loss properties. By increasing the number of steps, TIR element 10 materials content is minimized. However, light losses also increase with an increase in the number of TIR 10 element steps. This is caused by an increasing proportion of loss creating refraction due to the increasing proportion of radius area to entry face area.

LED signal, power supply and control circuitry is described in detail in U.S. patent application Ser. No. 10/039407 filed Nov. 7, 2001 hereby incorporated by reference in its entirety. An array of LEDs 50 is mounted on a printed circuit board 60. The LEDs 50 may be selected to have a narrow illumination angle, for example, 8 degrees. Therefore, the light generated by the LEDs 50 is generally aligned with the lens axis. Portions of the LED light at the edges of the light spread are still usable due to the focusing effect of the curved incident face 20.

Figure 10:
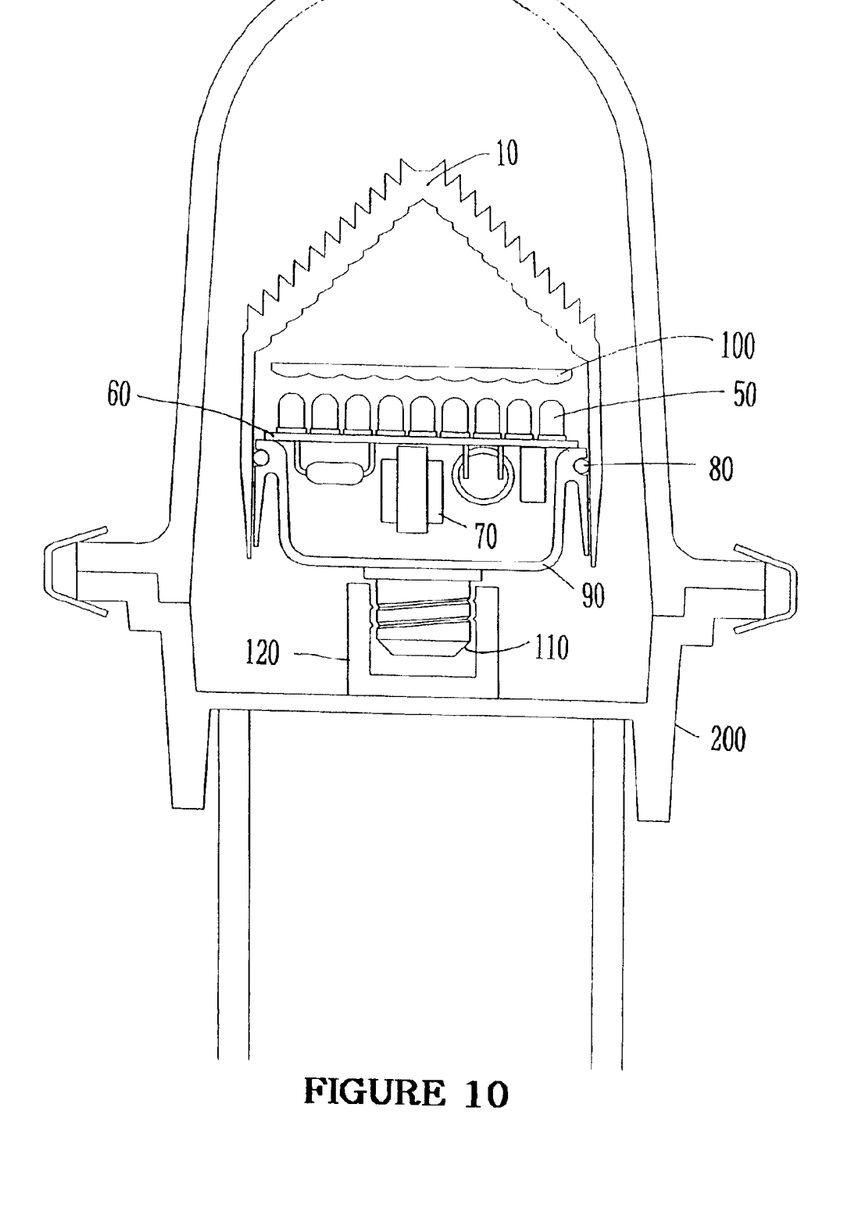
FIG. 10 is a cut-away side view of a second omni-directional embodiment of the invention utilizing a collimating lens, shown mounted in a typical incandescent housing.

Electrical components 70 comprising, for example, a LED power supply and/or LED light degradation visible failure mode circuitry may be, for example, either remotely located or mounted on a reverse side of the PCB 60. The TIR element 10 mates to the housing 90 by, for example, a threaded, snap or friction fit that may be sealed by a gasket or O-ring 80. As shown in FIG. 10, the signal may be configured with a collimating lens 100 used to more closely align the LED 50 light output with the lens axis. The LEDs 50 may be, for example, standard encapsulated LEDs, surface mount LEDs, or an encapsulated LED array module with or without a heat sink as necessary.

Figure 12:
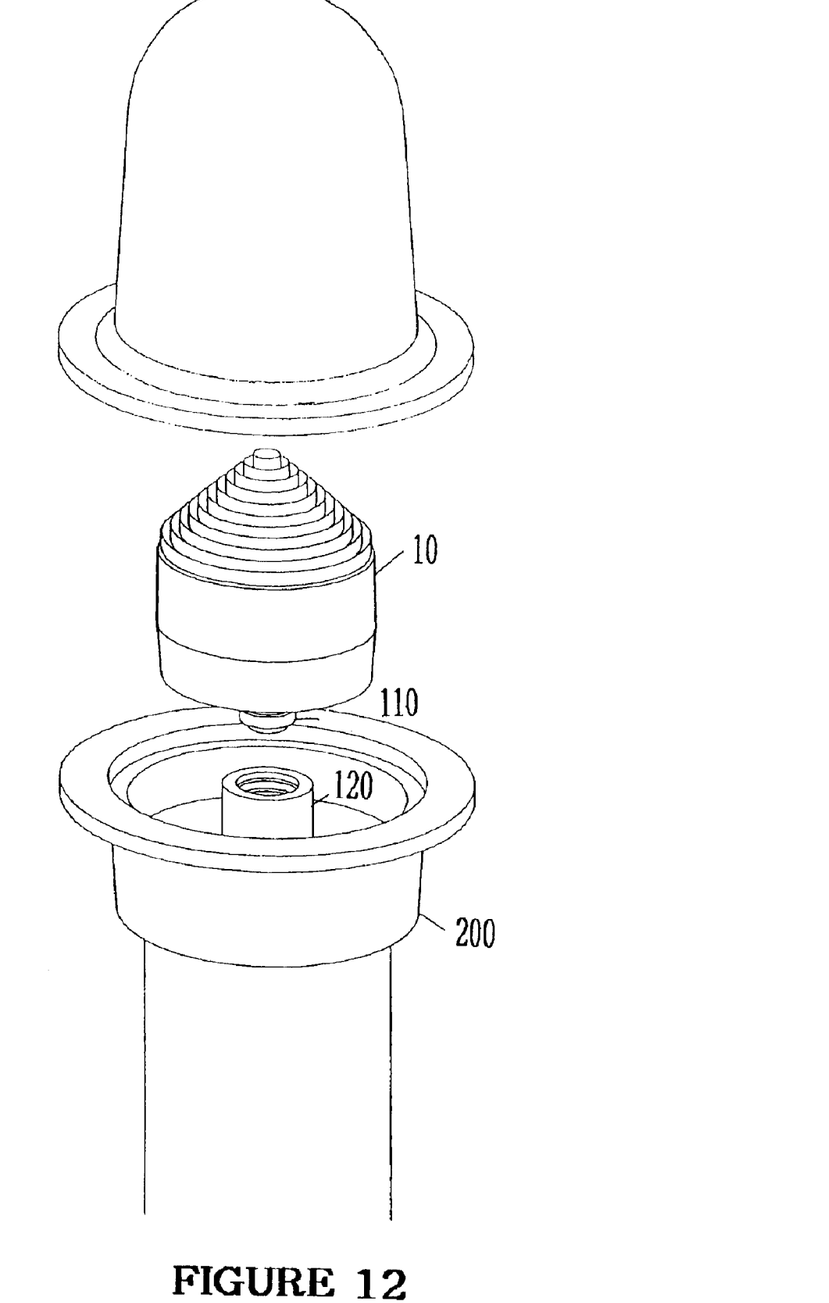
FIG. 12 is an exploded isometric view of the invention and a typical incandescent housing.

As shown in FIGS. 10 and 12, the signal may be configured to be retrofit into an existing incandescent signal 200. Power connection 110 may be via the socket 120 for the original incandescent bulb. In other embodiments, the invention may be configured as a general illumination fixture, a vehicle signal, a sign, yard or home illumination or any other embodiment where the minimal cost, extended service interval and/or ability for controlled display aspect is desirable. The invention is not limited to LEDs, and may be used with any point light source.

In an alternative embodiment, the total internal reflection element is used in conjunction with a collimating light engine.

In an alternative embodiment, the total internal reflection element is used with a light engine remote from the total internal reflection element. In one embodiment the light engine can be at variable height from the total internal reflection element. In one embodiment, the power supply is remote from the lamp.

In one embodiment, the total internal reflection element is made of polycarbonate and is strong and relatively shatterproof. The total internal reflection can be encased in a housing or serve as a portion of a housing for a light engine.

In one embodiment, the exit faces are out of alignment with the lens axis to facilitate removal from a mold. In one embodiment the exit faces are about 1° out of alignment with the lens axis.

In one embodiment, the light using the total internal reflection element can be placed at any desired height by adjusting a post or other mounting element.

What is claimed is:

1. A side projecting signal comprising:
   a housing having a base;
   a light source mounted in the interior of the housing, said light source comprising at least one LED;
   a total internal reflection element, said total internal reflection element comprises:
      a plurality of stepped levels; each said stepped level comprises at least one curved entry face on a near side surface of the total internal reflection element;

one corresponding total internal reflection face corresponding to each said curved entry face; and one corresponding exit face corresponding to each said total internal reflection face, said exit face on a far side surface of the total internal reflection element;

wherein substantially all light from the light source incident upon each of said entry faces is refracted to be incident upon the corresponding total internal reflection face, and substantially all of the light incident upon the corresponding total internal reflection face is reflected to the corresponding exit face to redirect light from the light source into a side direction.

2. The signal of claim 1, wherein the curved entry faces concentrate incident light onto a center of the corresponding total internal reflection face.

3. The signal of claim 2, wherein the light incident on the total internal reflection faces can be from a range of angles and the incident light is redirected through the corresponding exit face.

4. The signal of claim 1, wherein the housing has an open end and said total internal reflection element closes the open end of the housing.

5. The signal of claim 1, wherein the total internal reflection element is mounted in the interior of the housing.

6. The signal of claim 1, wherein the curved entry faces are angled in the direction of the next stepped level.

7. The signal of claim 1, wherein the housing is an existing incandescent housing and the at least one LED and the total internal reflection element are retrofit into the housing.

8. The signal of claim 7 wherein the signal is the same size as an incandescent bulb and is adapted to be retrofit into an incandescent signal housing.

9. The signal of claim 1, wherein the total internal reflection element is injection molded.

10. The signal of claim 9, wherein the total internal reflection element is provided in a cone.

11. The signal of claim 9, wherein the total internal reflection element is substantially linear.

12. The signal of claim 9, wherein the total internal reflection element is partially conical and partially linear.

13. The signal of claim 1 wherein the total internal reflection faces are curved.

14. The signal of claim 13 wherein the total internal reflection faces curve between a peak and a trough.

15. The signal of claim 1, wherein the exit face are curved.

16. The signal of claim 1, wherein the light source is spaced away from the total internal reflection element.

17. The signal of claim 1, wherein the light source is interchangeable.

18. The signal of claim 1 wherein the entry faces curve between a peak and a trough.

19. The signal of claim 1 wherein the total internal reflection element closes the housing.

20. A total internal reflection element having a plurality of stepped levels comprising:

a plurality of curved entry faces on a near side surface of the total internal reflection element;

a plurality of corresponding total internal reflection faces; and a plurality of corresponding exit faces on a far side surface of the total internal reflection element;

each of said stepped levels comprises at least one said curved entry faces and at least one corresponding total internal reflection face and at least one corresponding exit face;

wherein substantially all light from a lamp incident upon each of said entry faces is refracted to the corresponding total internal reflection face, and substantially all of the light incident upon each of said total internal reflection effaces is reflected to the corresponding exit face and wherein said total internal reflection element redirects the light into a side direction.

21. The total internal reflection element of claim 20, wherein the curved entry faces concentrate the incident light onto a center of the corresponding total internal reflection face.

22. The total internal reflection element of claim 20, wherein the total internal reflection element is injection molded.

23. The total internal reflection element of claim 22, wherein the total internal reflection element is provided in a cone.

24. The total internal reflection element of claim 22, wherein the total internal reflection element is substantially linear.

25. The total internal reflection element of claim 22, wherein the total internal reflection element is partially conical and partially linear.

26. The total internal reflection element of claim 20, wherein the exit faces are curved.

27. The total internal reflection element of claim 26 wherein the exit faces curve between a peak and a trough.

28. The total internal reflection element of claim 20, wherein the total internal reflection element faces are curved.

29. The total internal reflection element of claim 20, wherein the total internal reflection element is retrofit into an existing lamp.

30. The total internal reflection element of claim 20, wherein the total internal reflection element is used in conjunction with a light engine which can be installed at different heights.

31. The total internal reflection element of claim 20, wherein the light engine emits collimated light.

32. The total internal reflection element of claim 20, wherein the total internal reflection element is located in a housing.

33. The total internal reflection element of claim 20, wherein the total internal reflection element forms at least a portion of a housing for the lamp.

34. The total internal reflection element of claim 20 wherein the entry faces curve between a peak and a trough.

* * * * *